Jan. 7, 1964 H. H. ADELAAR 3,117,185

TRANSIENT REPEATER

Filed May 12, 1959 2 Sheets-Sheet 1

*Inventor*
H. ADELAAR
By R. F. Morris
*Attorney*

Jan. 7, 1964 H. H. ADELAAR 3,117,185

TRANSIENT REPEATER

Filed May 12, 1959 2 Sheets-Sheet 2

Inventor
H. ADELAAR
By R P Morris
Attorney 3,117,185
Patented Jan. 7, 1964

3,117,185
TRANSIENT REPEATER

Hans Helmut Adelaar, Antwerp, Belgium, assignor to International Standard Electric Corporation, New York, N.Y., a corporation of Delaware Filed May 12, 1959, Ser. No. 812,640
Claims priority, application Netherlands June 17, 1958
5 Claims. (Cl. 179—15)

The invention relates to a transient repeater and more particularly to a bidirectional repeater adapted to be effectively and repeatedly connected during predetermined short and equal time intervals between two electrical energy reactive storage devices periodically interconnected on a tuned circuit basis.

Such transfer or pulse modulator-demodulator circuits, hereinafter termed pulse modem circuits may be used in time division multiplex telecommunication systems, and are described for instance in the United States patent applications of K. Cattermole, Serial No. 550,163, filed November 1955, now Patent No. 3,020,349, and K. Cattermole et al., Serial No. 663,704, filed June 1957, now Patent No. 3,073,903.

Briefly, voice frequency energy may be passed to a shunt condenser through a low pass filter at the sending end and during periodically repeated short time intervals, e.g. 5 microseconds at a frequency of 10 kc./s., the condenser at the sending end is connected to a similar condenser at the receiving end which is followed by a similar low pass filter to recuperate voice frequency energy at the receiving end. This interconnection is performed through one or more multiplex time division links or highways which may be used in common for a plurality of such communications, and the transfer circuit between the two condensers is arranged to include at least one series inductance which may be provided in said highways. With the time interval for each energy transfer being equal to a half period of the series resonant circuit thus periodically established, the charges on the two condensers initially present at the beginning of each time interval, will have been exchanged at the end of each time interval. In principle, such a bidirectional communication system has the outstanding advantage of eliminating the sampling losses inherently associated with previous pulse amplitude modulation time division multiplex systems.

Nevertheless, in practice, some losses will be suffered. In particular, these will be due to the resistive losses inevitably associated with practical inductances, and also those losses associated with the electronic gates used to repeatedly switch the inductance between the two condensers. Although these losses may be kept slight in some cases, in other circumstances they may become objectionable and should be compensated by amplifying means. For instance, this may occur when the transmission path includes several gates in series, e.g. 4 or more. Moreover, whatever the losses may be, they will always be accompanied by corresponding reflections. More precisely, the series resonant circuit in which the condensers are repeatedly connected, is damped to some extent with the result that the waves across the two condensers are essentially cosine half-waves, but with the damping resulting in their amplitudes decreasing exponentially. This means that with one condenser initially charged at the beginning of an energy transfer time and with the other condenser discharged, while the latter will not be completely charged to the initial voltage across the former at the end of the transfer interval, simultaneously there will be a residual voltage across the condenser initially charged.

An object of the invention is to secure amplification means in such a system as described above, and which means can be inserted in the high frequency pulse circuits, thus in the links used in multiplex fashion for several communications, so as to reduce the number of such amplification means.

In accordance with a first characteristic of the invention, a transient repeater of the type initially defined at the beginning of this description is characterised in that, in addition to at least one reactance enabling the transfer of energy between said reactive storage devices on a tuned circuit basis, said repeater includes at least one negative resistance and is designed to produce a gain equal to or exceeding the loss normally incurred in performing said energy transfer on a tuned circuit basis through transfer means including said reactance and suffering from resistive losses, said repeater being designed so as to be in a stable condition while it is not effectively connected between said reactive storage devices.

If amplification compensating resistive losses caused for example by the resistance of the gates and of the inductances is desired, one may use a series negative resistance in the interconnecting highway, the magnitude of this negative resistance being chosen equal to the positive series equivalent resistance of these gates and inductances. In this way, the transfer circuit will behave as an ideal reactive circuit and no overall losses will be suffered.

If reactive storage means realized by way of shunt condensers are used, to be serially interconnected through an inductance in series with such a negative resistance, the latter should be of the series or open circuit stable type so that upon the interconnecting gates being blocked, the negative resistance circuit will not oscillate. Preferably, the negative resistance circuit should provide a constant negative resistance within the useful frequency band, but for higher frequencies, outside the useful band, the negative resistance component should rapidly drop to zero or even become positive, lest it oscillates with the distributed capacitance of the highway when all the interconnecting gates are closed. Bearing in mind that practical negative resistance circuits generally produce a negative resistance associated with a series inductance, this may be tolerated provided the latter is reasonably constant since the negative resistance circuit will in any event be serially associated with an inductance to perform the transfer of energy on a series resonant circuit basis.

In some cases it might be desirable to secure not merely an overall compensation of the losses, but also an overall gain. Then, within the useful bandwidth, and within certain limits, the magnitude of the negative resistance may be chosen higher than the resultant positive resistance of the passive transfer circuit. The series resonant circuit will then be negatively damped with the result that the cosine waves mentioned above now have exponentially increasing amplitudes. Intrinsically, such a network is therefore unstable. But, since it is to be used in a transient manner, sustained oscillations cannot arise as the oscillation will not get sufficient time to build up within the short opening time of the gates and the amplitudes may be kept sufficiently small to avoid saturation or failure of components. As soon as the interconnecting gates are again made non-conductive, the oscillation circuit is severed from its capacitive stores, and whatever has been stored therein will be discharged into the audio frequency circuits through the low pass filters within the ensuing interval before the interconnecting gates are again made conductive. In this respect, the pulse modem circuits virtually act as constant impedances equal to the impedances of their connected lines reflected through the line transformers usually associated with the filters on the voice frequency side.

The operation of such a transient oscillating circuit may be compared with that of a super-regenerative detector in which periods of oscillations build up alternately with quenching periods. When there is no signal present at the time the gates are made conductive, an oscillation can start from a small noise peak whereby the noise would be amplified, but no more than a signal, so that the signal to noise ratio is not affected.

If the negative resistance is unable to offset the line resistance, i.e. as long as its absolute value is smaller than twice the real component of the line impedance, the circuit will be stable. For, if this limit is exceeded, this would mean that the storage condenser would obtain more charge during the interconnecting time or channel pulse than it loses during the interval between successive channel pulses.

However, when the overall resistance of the series resonant circuit is made negative, resulting in exponentially increasing cosine waves, reflections again occur in the same way as those already occur with an overall positive resistance leading to exponentially decreasing cosine waves, and the larger the amplification, the larger will be the amount of reflection.

A further object of the invention is to secure amplification means as characterised above in which an overall gain may be achieved without being accompanied by substantial reflections.

In accordance with a further characteristic of the invention, a transient repeater as previously characterised is further characterised in that it comprises a transfer network with such characteristics that with a given energy in one of said storage devices and zero energy in the other at the time said transfer network is effectively connected between said storage devices, a larger energy than said given energy may be stored in said other storage device at the time said transfer network is effectively disconnected from said storage devices while simultaneously, substantially zero energy is stored in said one storage device.

Hereinafter, for purposes of description, a four-terminal network will be termed a quadripole, and a two-terminal network will be termed a dipole. The network theory of the four-terminal and two-terminal networks may be found in Terman's Radio Engineer's Handbook, McGraw-Hill Publication, 1943, pages 197–251.

The above and other objects and characteristics of the invention and the best manner of attaining them will be better understood from the following detailed description of embodiments of the invention to be read in conjunction with the accompanying drawings comprising FIGS. 1 to 10 in which.

Some considerations will first of all be given on the use of a negative resistance two-terminal network or dipole to eliminate the effect of resistive losses in a system in which energy is transferred in a tuned circuit.

Figure 1:
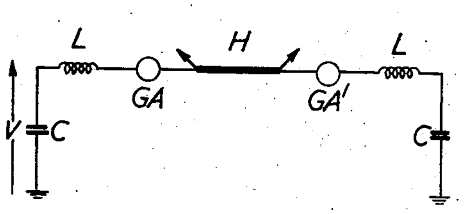
FIG. 1 shows a time division multiplex link associated with two reactive storage devices on a tuned circuit basis.

FIG. 1 shows a simplified form of the so-called pulse modem circuit which can be used to advantage in time division multiplex systems. Two storage condensers of equal capacity C constitute shunt elements with one end connected to ground while the other ends of these two condensers are connected together through a so-called multiplex highway H which, as indicated by the multipling arrows, can be used in common for several simultaneous connections by means of pulses on a time sharing basis. On each side of the highway H, the free end of the condenser C is connected through a series coil, the coils having equal inductances L, and also a series gate such as GA. When both gates are made conductive simultaneously, a closed circuit obtains and if it is assumed there are no resistive losses in this circuit, at the time the loop circuit is established, an interchange of voltages can be secured for the two condensers after a certain time which may be made to correspond to the interval during which the two gates are conducting.

Indeed, the lossless circuit is such that the voltages across the left-hand and the right-hand condensers assume the shapes of cosine waves having a period equal to $2\pi\sqrt{LC}$. The two cosine waveforms are complementary with respect to the voltage V, the sum of the initial voltages across the condensers. Assuming for instance that initially the right-hand condenser is discharged while the left-hand condenser has a voltage V across its plates. If the gates are made conductive during exactly a half period equal to $\pi\sqrt{LC}$, when the flow of current is interrupted, the right-hand condenser will now have a voltage V across its plates while the left-hand condenser is completely discharged.

In practice, this loop circuit will exhibit losses due mainly to the resistances of the gates in series with the effective resistances of the coils. If the overall resistance is taken as 2R, the voltage waveforms will now be damped cosine waves. After a half period the voltage across the right-hand condenser will now be equal to GV while the voltage across the left-hand condenser will at the same time be equal to $(1-G)V$, G being defined by $$G=\frac{1+e^{-\pi d}}{2} \tag{1}$$

where $d$, the logarithmic decrement, is given by $$d=\frac{R}{2}\sqrt{\frac{C}{L}} \tag{2}$$

As G is smaller than unity, there is therefore a voltage loss since the output condenser is not fully charged to the initial voltage on the input condenser, while on the other hand there is a residual voltage across the input condenser, corresponding to a reflection.

If negative resistances are serially inserted, for instance a negative resistance in the highway H, this negative resistance being for example of the type disclosed in U.S. Patent No. 2,843,765, issued July 15, 1958, to P. R. R. Aigrain and entitled Circuit Element Having a Negative Resistance, it may be chosen so as to exactly compensate the positive resistance equivalent to the losses whereby a purely reactive circuit is again obtained for a perfect interchange of the voltages of the two condensers.

If moreover, the magnitude of this series negative resistance is made larger than that of the positive resistance, $d$ becomes negative whereby G is now larger than unity.

Figure 2:
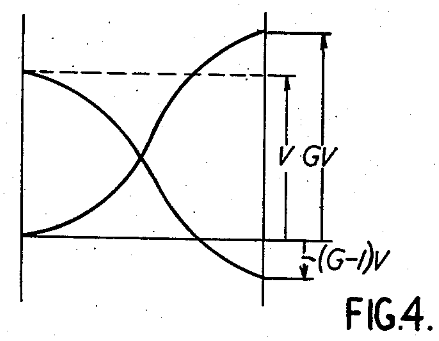
FIG. 2 shows curves representing the voltages across the two condensers of the circuit of FIG. 1 in function of time and as cosine waves with exponentially increasing amplitudes.

As shown in FIG. 2, the cosine waves are now increasing exponentially and a voltage gain G greater than unity can be secured. But, the input left condenser is overdrawn in this process with the result that it is left with a negative voltage of magnitude $(G-1)V$. Thus, this is a reflection back into the input which results in an increase of dissipation at that input whereby the overall voltage amplification will in fact be smaller than G.

Figure 3:
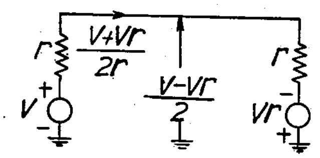
FIG. 3 shows an equivalent circuit of the input of a pulse modem circuit connected to a source of voltage.
Figure 4:
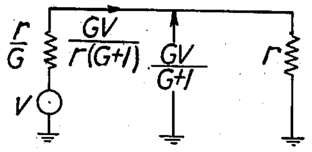
FIG. 4 shows an equivalent circuit of the output of a pulse modem circuit connected to a load resistance.

The actual power amplification which may be obtained by the insertion of a series negative resistance which over-compensates the positive series resistance may be found with the help of the equivalent circuits shown in FIGS. 3 and 4.

FIG. 3 represents a grounded input source of voltage V and of resistance $r$, directly connected to an input modem of equivalent resistance $r$. This input resistance $r$ of the modem is serially connected with a grounded negative source $V_r$, this additional voltage simulating the reflected voltage previously explained. The current flowing in the circuit of FIG. 3 as well as the voltage at the input of the modem, i.e. between the junction points of the two resistances $r$ and of the two grounded generators respectively, can be readily calculated and have been indicated in FIG. 3. Further, it has been explained above (FIG. 2) that the reflected voltage is $G-1$ times the input voltage of the modem. As shown in FIG. 3, the latter is a function of $V_r$ the reflected voltage, and accordingly the latter is found to be given by $$V_r=\frac{G-1}{G+1}V \qquad (3)$$

The value for $V_r$ obtained above may now be replaced in the expressions of FIG. 3 giving current and the input voltage to the modem which respectively becomes $$\frac{VG}{r(G+1)} \qquad (4)$$

$$\frac{V}{G+1} \qquad (5)$$

These results now lead to the equivalent circuit of FIG. 4, which represents the conditions at the output of the output modem, where power is delivered to the load by an equivalent generator of voltage V in series with an effective source resistance $$\frac{r}{G}$$

the load being represented by a resistance $r$. The source resistance shown in FIG. 4 will be recognized as equal to the apparent input resistance of the circuit of FIG. 3 which is obviously given by the ratio between the Expressions 5 and 4. This source resistance $$\frac{r}{G}$$

for the output circuit can be justified by recalling that the voltage produced at the output of the modem is G times the input voltage, i.e. G times that given by (5). The output current being equal to this output voltage of the modem circuit divided by the load resistance $r$, this readily gives the effective source resistance indicated in FIG. 4, where the output voltage across the load and the current flowing through it have also been indicated. These values being known, the overall power gain due to the insertion of the modem circuits is found to be equal to $$\left(\frac{2G}{G+1}\right)^2 \qquad (7)$$

This overall power gain ratio increases with G; it reaches unity when G is equal to unity and further tends to a maximum of 4 (6 decibels) as G tends to infinity. Thus, the theoretically obtainable maximum power gain ratio is far less than the power gain ratio of $G_2$ which could be secured if reflection did not occur.

Since the effective input impedance of the modem (FIG. 3) is equal to $$\frac{r}{G}$$

it is not matched to the source resistance and it might be thought useful to step up the input impedance of the modem with the help of a transformer having an impedance ratio G. By this measure, the reflection at the input could be compensated, but instead there now obtains a reflection at the output, and this is even more objectionable, as the reflected wave is again amplified during its return.

It can be shown that when G reaches 2, the circuit becomes unstable due to the multiple reflections which occur at both ends. But even if G is only a little greater than unity, producing only a very slight overall insertion gain, the reflections are most undesirable since they result in appreciable phase distortion and loss of high frequencies. Another expedient would be to make the left storage condenser (FIG. 1) G times as large as the right storage condenser. Then, the initial charge (GC)V initially fully stored on the left-hand condenser will be found again after a half period as C(GV) fully stored on the right-hand condenser. Thus, this leaves the left condenser completely discharged, so that for waves travelling from left to right there will be no reflection. However, this is also not a satisfactory solution since for waves travelling from right to left there will be an appreciable reflection, as the right-hand condenser will be substantially overdrawn. In other words, the circuit is no longer symmetrical as it was obviously to be expected. Moreover, as the time constant of the left-hand modem is G times as long, the charging of the storage condenser from the input circuit (FIG. 3) is incomplete, so that of an incident voltage V, only about $$\frac{V}{G}$$

penetrates through the modem.

It will now be shown that interconnection of the two storage condensers by a suitable quadripole incorporated in the highway and including at least one negative resistance element, can produce an increased voltage across the output condenser while at the same time the input condenser is exactly discharged, there being no reflection. It has been found that in order to be satisfactory, such a quadripole may for example be symmetrical and have an image impedance corresponding to a negative resistance in series with a positive inductance, while the image transfer constant of this symmetrical quadripole is a positive real constant, independent of frequency.

Since the transient properties of the quadripole are actually the important ones permitting to secure the required amplification without reflection, the quadripole may further be defined by the characteristics of its instantaneous input and output voltages and currents. It has been found that while the quadripole is effectively connected between the input and the output storage devices, these input and output voltages and currents should include the sum of at least two sinusoids with exponentially increasing amplitudes.

If the quadripole is symmetrical, the analysis of its operation and particularly its transient operation may be simplified by considering that the instantaneous input and output voltages $v_1$ and $v_2$ respectively are decomposed into the sum and the difference respectively of two other voltages. Obviously, these are half the sum and half the difference of these input and output instantaneous voltages respectively, i.e.

$$\frac{V_1+V_2}{2} \text{ and } \frac{V_1-V_2}{2}$$

In such a case, the determination of the roots of the complete network may be made separately for $v_1+v_2$ on one hand and $v_1-v_2$ on the other. In each case, the quadripole becomes an equivalent dipole. Indeed, for the roots determining the shape of $v_1+v_2$, it suffices to fold the quadripole on itself so that the corresponding input and output points are interconnected, as well as all modes of the network which are symmetrical with respect to one another. For the roots determining the shape of $v_1-v_2$, all the ends of the branches of the quadripole which are normally grounded should remain interconnected with one another, but disconnected from ground, thus again producing a dipole.

If the dipole including the external storage devices and determining the shape of $v_1-v_2$ has two conjugate complex roots $n_0\pm jw_0$, while the dipole including the external storage devices and determining the shape of $v_1+v_2$ has also two conjugate complex roots $n_1\pm jw_1$, $v_1$ and $v_2$ will indeed be in the form of algebraic sums of two distinct sinusoids each with exponentially increasing amplitudes provided both $n_0$ and $n_1$ are positive while $w_0$ and $w_1$ are also positive and distinct from one another. Thus, one may write $$v_1-v_2=V_0e^{n_0t}\cos(w_0t+a_0) \tag{8}$$

$$v_1+v_2=V_1e^{n_1t}\cos(w_1t+a_1) \tag{8'}$$

In the above two equations, $V_0$, $V_1$ and $a_0$, $a_1$ are constants yet to be determined from the initial conditions.

If the input and output storage devices are constituted by condensers of equal capacity C, the input and output currents $i_1$ and $i_2$ respectively, may be obtained from (8) and (8′) by differentiation, i.e.

$$i_1-i_2=CV_0e^{n_0t}(n_0\cos(w_0t+a_0)-w_0\sin(w_0t+a_0)) \tag{9}$$

$$i_1+i_2=CV_1e^{n_1t}(n_1\cos(w_1t+a_1)-w_1\sin(w_1t+a_1)) \tag{9'}$$

If initially, at $t$ equal to 0, $v_1$ is equal to V while $v_2$ is equal to 0, one may write $$V=V_0\cos a_0=V_1\cos a_1 \tag{10}$$

Two further initial conditions are needed to complete the determination of the constants and these will be given by the initial value of the currents $i_1$ and $i_2$. Then the network which has been envisaged here may be further determined by imposing additional conditions such that at the time $t$ equal to $t_1$, $v_1$ will be equal to 0, while at the same time $v_2$ will be equal to a larger value than V. This may be solved in various ways, but it is advantageous to impose yet another condition on the network. Indeed, it is preferable that when satisfying the relation making $v_1$ equal to 0 at time $t_1$, the slope of this voltage $v_1$ should at that time be small and preferably 0. In such a case parameter variations, e.g. due to tolerances, corresponding with a departure of $t_1$ from the value satisfying the relation giving zero input voltage at time $t_1$, will be of smaller influence. Thus, for a given amount of variation, the amount of reflection will be smaller. Likewise if the slope of $v_2$ is also zero at time $t_1$, the voltage gain will also be less affected by parameter variations. In other words, if the reactances part of the quadripole network only include inductances, the extra condition corresponds to zero energy being stored in these inductances at the end of the time during which the quadripole effectively interconnects the two condensers.

Thus, at time $t_1$, the extra condition corresponds to both $i_1$ and $i_2$ being equal to 0, leading to $$n_0=w_0\tan(w_0t_1+a_0) \tag{11}$$

$$n_1=w_1\tan(w_1t_1+a_1) \tag{11'}$$

But, these extra conditions (11) and (11′) can only be satisfied if inductive branches only interconnect the ungrounded input and output terminals. Therefore, at the moment the quadripole is effectively interconnected between the two condensers, i.e. at time $t=0$, $i_1$ and $i_2$ should also be equal to zero leading to $$n_0=w_0\tan a_0 \tag{12}$$

$$n_1=w_1\tan a_1 \tag{12'}$$

The four initial conditions have now been established and the constants $V_0$, $V_1$ and $a_0$, $a_1$ may be determined from (10), (12) and (12′).

Moreover, in view of the extra conditions which have been imposed for the slopes of $v_1$ and $v_2$ at time $t_1$, i.e. (11) and (11′), these last two conditions together with (12) and (12′) obviously lead to the conclusion that both $w_0t_1$ and $w_1t_1$ should be multiples of $\pi$. Using this result, together with (10), to determine $v_1$ and $v_2$ at time $t_1$, one obtains $$\frac{2v_1}{V}=\pm(e^{n_1t_1}-e^{n_0t_1}) \tag{13}$$

$$\frac{2v_2}{V}=\pm(e^{n_1t_1}+e^{n_0t_1}) \tag{13'}$$

by the addition of (8′) to (8) and the subtraction of (8) from (8′) respectively, and provided $(w_0-w_1)t_1$ is an odd positive or negative, multiple of $\pi$. The positive signs in the above two equations correspond to $w_0t_1$ being an odd multiple of $\pi$ while the negative sign corresponds to $w_1t_1$ being an odd multiple of $\pi$.

Considering (13) it is now clear that $v_1$ may be made equal to zero at time $t_1$ provided $$n_0=n_1=n \tag{14}$$

i.e. the real parts of the pairs of conjugate complex roots should be equal.

If (14) is satisfied, (13′) becomes $$\frac{V_2}{V}=\pm e^{nt_1} \tag{15}$$

thus giving the gain which is equal to $2\pi t_1$ nepers. The positive sign indicates a gain without phase reversal and corresponds to $w_0t_1$ being an odd multiple of $\pi$, whereas the negative sign corresponds to a gain with a phase reversal, and in the case where $w_1t_1$ is an odd multiple of $\pi$.

While $w_0t_1$ and $w_1t_1$ may be any multiples of $\pi$ provided $(w_0-w_1)t_1$ is an odd multiple, it appears preferable to choose the smallest possible values since in such cases, the effects of parameter variations will be minimized and the amount of undesired reflection and of departure of the gain from the nominal value will become much less. Indeed, if the interconnecting interval $t_1$ corresponds to a substantial number of half waves both for $w_0$ and $w_1$, it is clear that parameter variations will be more prone to cause departures of $v_1$ and $v_2$ from their nominal values at time $t_1$, than if the number of half waves is kept to a minimum.

With this in mind, there are therefore two particular solutions. The first corresponds to $w_0t_1$ equal to $\pi$ with $w_1t_1$ equal to $2\pi$ and to a gain without phase reversal, while the second particular solution corresponds to $w_0t_1$ equal to $2\pi$ together with $w_1t_1$ equal to $\pi$ and therefore corresponding to a gain with phase reversal.

Figure 5:
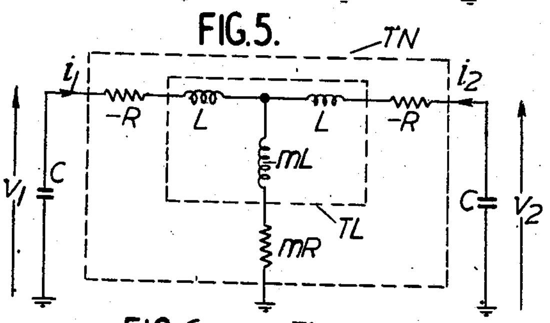
FIG. 5 shows a four-terminal transfer network or quadripole suitable for the transient interconnection of two condensers and permitting to secure a voltage gain without reflections.

FIG. 5 shows a symmetrical T network which may satisfy the requirements discussed above and particularly Equations 8 and 8′. While other networks may also be found satisfactory, the illustrated one is believed to be one of the simplest arrangements providing a gain without reflections.

This symmetrical T network TN is shown to interconnect the free ends of the input and output condensers, both having a capacity C and their other ends connected to ground together with the third terminal of the network TN. This network comprises two identical series branches each formed by a negative resistance of magnitude R in series with a positive inductance L.

Thus, the total series inductance 2L corresponds to that shown in FIG. 1 except that it is now located in the common highway. On the other hand, the total negative series resistance of magnitude 2R corresponds to the magnitude of the negative resistance serially inserted in the highway, minus the smaller total positive resistance constituting losses e.g. the resistance of the gates and the coils.

The shunt branch includes a positive resistance $m$R in series with a negative inductance of magnitude $m$L, $m$ being any value smaller than one-half, i.e.

$$\frac{1}{2}>m \tag{16}$$

The image impedance $Z_0$ of such a symmetrical T network as shown in FIG. 5 is found to be $$Z_0=Z\sqrt{1-2m} \tag{17}$$

wherein the impedance Z is given by $$Z=-R+jwL \tag{18}$$

On the other hand, the image transfer constant A will be given by $$\sqrt{A}=\frac{1-m+\sqrt{1-2m}}{m} \tag{19}$$

Thus, the image impedance and the image transfer constant are seen to satisfy the particular requirements given initially above.

In order to determine the value of the conjugate complex roots $n_0 \pm jw_0$ determining the shape of $v_1-v_2$, the network of FIG. 5 may be considered with the shunt branch disconnected from ground. Then, the equation for the roots of $p$ the imaginary angular frequency, i.e. $jw$ is $$\frac{L}{P}\left(p^2-\frac{R}{L}p+\frac{1}{LC}\right)=0 \tag{20}$$

Similarly, in order to determine the conjugate complex roots $n_1 \pm jw_1$, which define the shape of $v_1+v_2$, the network of FIG. 5 may be folded about the shunt branch so that the input and output condensers are now paralleled. Then, the equation for the roots of $p$ is $$\frac{(1-2m)L}{p}\left(p^2-\frac{R}{L}p+\frac{1}{(1-2m)LC}\right)=0 \tag{20'}$$

From (20) and (21) it is clear that the real parts of the two pairs of conjugate complex roots are the same and moreover positive, i.e.

$$n_0=n_1=n=\frac{R}{2L} \tag{21}$$

Also, from (20) and (20′) one obtains the complex parts of the roots, i.e.

$$w_0^2=\frac{1-d^2}{LC} \tag{22}$$

$$w_1^2=\frac{1-(1-2m)d^2}{(1-2m)LC} \tag{22'}$$

wherein $d$ has the value already given by (2). From (22) it is clear that $d$ may take any positive value smaller than unity, while from (20′) it is clear that $m$ may take any value smaller than one-half, provided (22′) says positive.

In the preceding general discussion of the requirements to be imposed on the interconnecting quadripole, it was found that the ratio between the two angular frequencies defined by (22) and (22′) should be preferably be equal to 2. Therefore, this requirement leads to $$m=\frac{3(1-d^2)}{2(4-3d^2)}=\frac{12L-3CR^2}{32L-6CR^2} \tag{23}$$

or $$-m=\frac{3(1-d^2)}{2(1+3d^2)}=\frac{12L-3CR^2}{8L+6CR^2} \tag{23'}$$

depending respectively on whether $w_1$ is equal to twice $w_0$ or the reverse. In the first case (23) shows that $m$ is positive, while in the second case (23′) shows that $m$ is negative. In the second case therefore, the shunt inductance is in fact positive while the shunt resistance is in fact negative. It is in this last case that the gain will be accompanied by a phase reversal, whereas no phase reversal is incurred in the first case corresponding to a positive value for $m$.

Since the gain in nepers is equal to $2\pi t_1$ in the first case where $m$ is positive, the gain may be expressed in function of $d$ as $$\frac{2\pi d}{\sqrt{1d^2}}$$

while in the second case corresponding to a negative value for $m$, the gain will be doubled. Thus, the gain in nepers increases as $d$, the logarithmic increment, increases from zero towards unit, while at the same time this means in the first case, a decrease in the value of $m$ which goes down from 3/8 towards 0, and in the second case an increase in the value of $m$ which goes up from —3/2 towards zero.

It will be noted that the T network TN shown in FIG. 5 includes a network of three inductances TL of which the shunt one may eventually be a negative inductance in case $m$ is positive. Particularly in the case where the shunt inductance is negative, such a T network of inductances can be realized as two inductively coupled coils in the manner shown in FIG. 6, the primary and secondary inductances having like values indicated on the figure as function of L and $m$ and the coupling factor $k$ being also a function of $m$, the windings being in series aiding as indicated by the dots. If all three inductances are positive ($m$ is then negative) they may also be realized by way of two inductively coupled coils but the coils should now be in series opposition.

It will be observed that the network of FIG. 5, particularly when $m$ is positive has the advantage of using only two negative resistances. This is an optimum condition, since two negative resistances are essential to secure positive values for the real parts of the two pairs of conjugate complex roots of the network interconnected with the condensers. Either these two negative resistances must be connected in branches of the quadripole which intervene in the determination of $v_1-v_2$ and in such a way that they also play a part in the determination of $v_1+v_2$, whereby they must be symmetrically located with respect to one another as in the present case, or alternatively, one negative resistance may be inserted in a single branch intervening in determining $v_1-v_2$ but which single branch does not intervene in the determination of $v_1+v_2$. In that case, the second negative resistance must be included in one of the branches of the network intervening in the determination of $v_1+v_2$ only so that it can provide the required positive value for $n_1$.

The network of FIG. 5 may obviously be transformed into a three-mesh network by changing the star network of resistances into a delta network. Whenever $m$ is positive and smaller than one half, the permanently closed loop resistive circuit would then have an overall positive resistance preventing spontaneous oscillations. Moreover, the transformation of the star network of resistances into a delta network may also be made together with the transformation of the star network of inductances into a pair of two mutually coupled inductances.

Figures 7, 8, 9, 10:
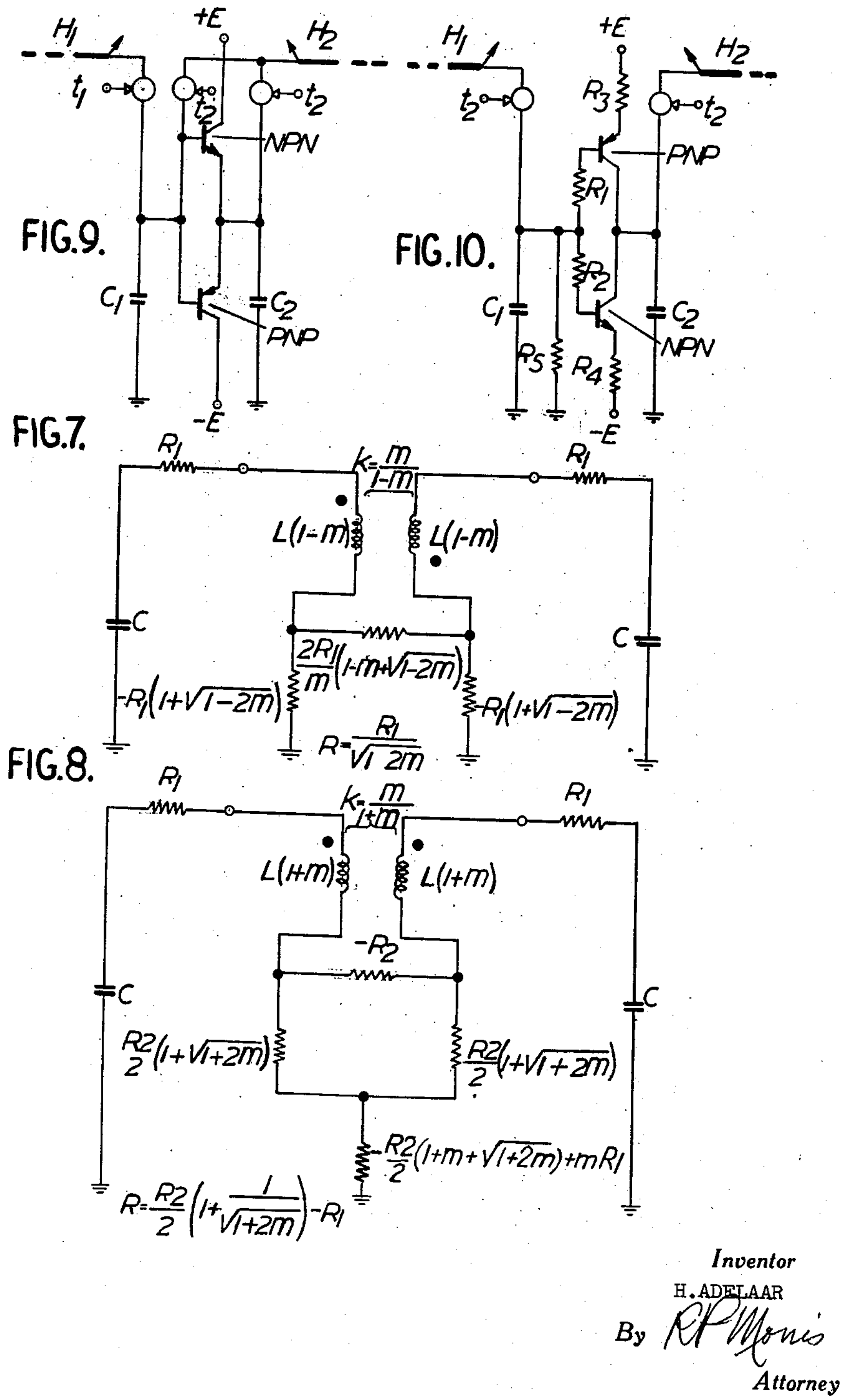
FIG. 7 shows a modified but equivalent version of the quadripole shown in FIG. 5 and securing a voltage gain without phase reversal.
FIG. 8 shows a modified but equivalent version of the quadripole shown in FIG. 5 and securing a voltage gain with phase reversal.
FIG. 9 shows a circuit diagram of an arrangement involving speech storage in a time division multiplex system and designed to produce a power gain.
FIG. 10 shows a further circuit arrangement representing a modification of the circuit of FIG. 7.

FIG. 7 shows this double transformation of the circuit of FIG. 5. Contrary to FIG. 6, the two mutually coupled inductances in series aiding no longer have a common terminal, they are each grounded through a negative resistance at one of their ends, and these ends are interconnected through a positive resistance. If the three resistances of FIG. 5 are transformed into a delta network, the two negative shunt resistances will have a magnitude equal to $m$ times the positive resistance. However, in general, there will remain positive resistances of value $R_1$ directly in series with the condensers, in the manner shown in FIG. 7. These resistances $R_1$ will at least include the resistive losses to be compensated. Then, the remaining three resistances shown in FIG. 7 are function of these resistances $R_1$ directly in series with the condensers, but there is one degree of freedom for their determination.

In FIG. 7, particular values have been indicated for these resistances which have been chosen, by way of example, so that variations in the values of the negative resistances connected to ground have a minimum effect on the relation between the values of the resistances which leads to equal real parts for the conjugate complex roots of the network, i.e. Equation 14.

Bearing in mind the relation between R and $R_1$ given in FIG. 7, the circuit of that figure is completely equivalent to that of FIG. 5.

In the case of the circuit of FIG. 5, but with $m$ having a negative value, so that the shunt inductance is now positive and the shunt resistance is now negative, the direct transformation of the star network comprising the three negative resistances would led to a closed loop resistive delta network of which the overall resistance is obviously negative. Nevertheless, this star network of three negative resistances can be transformed into an equivalent network including a resistive loop of which the overall resistance is positive. Moreover, this equivalent network only uses two negative resistances instead of three. Thus, an optimum network producing amplification with phase reversal and using only two negative resistances can also be obtained.

FIG. 8 represents the equivalent network of FIG. 5 in the case where $m$ is negative, this network using only two negative resistances.

FIG. 9 shows that the transformation of the resistances is also accompanied by a transformation of the inductances, although this is not essential. In the values of the elements shown in FIG. 8, $m$ has now been reckoned as positive, its value being given by the Expression 23′ which lies between zero and $$+\frac{3}{2}$$

In order to be able to transform the star network of the three negative resistances into a circuit including a delta network of which the overall resistance is positive, the shunt branches of the equivalent delta network must not be grounded, but must be connected to ground through a common negative resistance of sufficiently large magnitude. In other words, the negative shunt resistance of magnitude $m$R of FIG. 5 must be decomposed serially into a negative resistance of larger magnitude in series with a positive resistance which is larger than $$\frac{R}{2}$$

This is shown in FIG. 8, where series resistances $R_1$ have again been left directly in series with the condensers. The value of the negative resistance now interconnecting the two lower ends of the windings which contrary to FIG. 7, are now in series aiding, has been given as $-R_2$. There are now two degrees of freedom for the determination of the resistances and a particular value for the shunt positive resistances has been indicated in FIG. 8 by way of example. This value again corresponds to a minimum departure from Equation 14 when the value of these positive shunt resistances departs from the assigned one. Finally, the value of the common shunt negative resistance and function of $R_1$ and $R_2$ has also been indicated on the figure together with the relation between R on the one hand and $R_1$ and $R_2$ on the other.

Thus, with or without phase reversal a minimum of two negative resistances can be used, and in the case of a gain without phase reversal, the two negative resistances may eventually have one of their ends grounded, as shown in FIG. 7.

Figure 6:
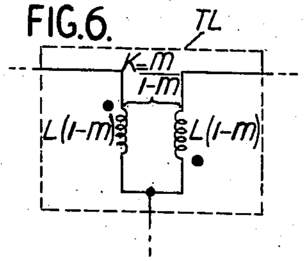
FIG. 6 shows a set of two loosely coupled coils representing an equivalent of the inductance network part of the quadripole of FIG. 5.

It should be remarked that the equivalent inductively coupled circuits of FIGS. 6, 7 and 8 are quite distinct from a transformer which necessitates tight coupling, i.e. $k$ close to unity, and which is difficult to realize over a wide frequency band. The coupling factor $k$ is never larger than $$\frac{3}{5}$$

when $m$ is determined by (23) or (23′).

It will be appreciated that the networks of FIGS. 5, 6, 7 and 8 have been given as examples, but that equivalent quadruples could be realized in different ways. It should be borne in mind, that circuits of this type, should preferably be open circuits stable to avoid oscillations when the gates are blocked, and if at such times any circuit mesh of the quadruple includes such a negative resistance the magnitude of the latter should be smaller than the equivalent positive resistance connected at its terminals, in particular the network should not contain any closed loops in which the resultant resistance component is negative.

Though the symmetrical quadruple used in FIG. 5 is a particular symmetrical T network, other equivalent or suitable configurations can of course be used, e.g. pi type or bridged T type, or more complex networks with a larger number of branches, for instance those of FIGS. 7 and 8 or even balanced quadruples such as those of the lattice type. Nevertheless, the illustrated embodiments are particularly advantageous in view of their simplicity.

Moreover, it is not absolutely essential that the image impedance and the image transfer constant of the quadruple should be as given by (17), (18), and (19). In the case of an equivalent symmetrical T network such as shown in FIG. 5 for instance, the impedance of the shunt branch is equal to that of the series branches multiplied by a negative (or positive) factor. The configuration of the shunt branch with respect to those of the series branches may eventually be different, and for example, it is not essential that the ratios between the resistances of the shunt and of the series branches should be equal to that between the inductances of the shunt and of the series branches. Nevertheless, such a relation does lead to a preferred design for the network.

What is essential is that a quadripole, and not a dipole, should be used if gain without reflection is to be secured, and that this quadripole should be such that after a certain time from the moment the circuit is made effective, the voltage across the input condenser should be zero instead of V while at the same time the voltage across the output condenser rising from zero, has become larger than V. Or more generally, after a certain time, function of the parameters, the voltage across one condenser should be a multiple of the voltage initially appearing across the other condenser, while simultaneously the voltage across that other condenser should preferably be the same multiple (assuming that equal gain is desired in both directions) of the voltage initially appearing on this one condenser.

On the subject of symmetry, it is also not essential that the network should show a symmetry between the input and the output. For instance, if the two condensers have different values, a symmetrical network of the type shown in FIG. 5 can be designed in function of the value of one condenser, and connected to the other condenser through an ideal transformer so that the network sees the second condenser as of equal value to the first. Then, the symmetrical network cascaded with the ideal transformer can evidently be reduced to an asymmetrical network without a transformer.

In the Belgian Patent No. 558,096 issued to E. Wright et al. issued December 1957 it has already been proposed to interpose intermediate reactive storage devices of the type disclosed in the aforementioned Belgian patent in order to permit a communication to pass through two cascaded time division multiplex links or highways without necessarily using the same time channel on both highways.

FIG. 9 shows how this principle can be applied to secure amplification when using reactive storage circuits interconnected on a tuned circuit basis, and when using different impedance levels.

FIG. 9 shows a highway $H_1$ which is interconnected to a highway $H_2$ through a plurality of intermediate storage devices such as those represented. Essentially, these intermediate storage devices comprise two grounded condensers $C_1$ and $C_2$. The free end of condenser $C_1$ is connected to highway $H_1$ through a gate while the free end of condenser $C_2$ is connected to highway $H_2$ through a second gate, a further gate still interconnecting the free end of condenser $C_1$ to highway $H_2$. The free ends of these two condensers are interconnected by the paralleled base to emitter paths of an NPN and a PNP transistor respectively whose collectors are respectively connected to fixed D.C. potentials +E and —E respectively.

The arrangement can provide unidirectional power amplification from highway $H_1$ to highway $H_2$ with the amplification increasing in function of the value of condenser $C_2$. This implies that the two highways are worked at different impedance levels. With this limitation however, the amplification arrangement, the operation of which will now be described, may thus replace a broad band pulse amplifier.

As shown on FIG. 9, a communication using time position or time channel $t_1$ on highway $H_1$ may use the intermediate storage device shown, which may in turn deliver amplified energy to highway $H_2$ during a different time channel than that used on the highway $H_1$, e.g. channel $t_2$. During the corresponding time channel $t_1$, the corresponding gate shown will be conductive so as to connect highway $H_1$ to condenser $C_1$ which will thus store the received energy sample. Whatever the polarity of the voltage across condenser $C_1$, either the NPN or the PNP transistor will be made conductive and consequently condenser $C_2$ will be charged either from source +E or from source —E until the voltage across condenser $C_2$ becomes equal to that across condenser $C_1$. Thus, the two transistors are used as three-pole switches to feed energy to condenser $C_2$. During time channel $t_2$, the corresponding pair of gates linking highway $H_2$ to the free ends of condensers $C_1$ and $C_2$ will be made conductive to discharge a speech sample of increased power onto highway $H_2$.

Despite the limitation of different impedance levels for the two highways there are nevertheless some practical applications, e.g. when several pulse modems are to be simultaneously connected to the same highway $H_2$, or if the speech sample is to be dispatched simultaneously to a plurality of highways such as $H_2$ all connected via an individual gate, to condenser $C_2$.

The arrangement could also be adapted to interconnect two highways at the same impedance level or to interconnect two channels on the same highway, by inserting a matching transformer between the two output gates on the highway. Two such amplifiers with matching transformers might be connected, each via its own gates, in mutually inverted positions, to deal with bothway transmission, provided two different channels are used on both highways for go and return transmission, e.g. time position $t_1$ could be used for both input gates and time position $t_2$ for both pairs of output gates. If the arrangement is to be used for amplification on one highway, four different time channels must be engaged, two for each direction of speech transmission.

Matching transformers are obviously undesirable in such broad band pulse connections and they may be obviated by the arrangement of FIG. 10 in which the two transistors are now used as amplifiers in common emitter connection.

As shown in FIG. 10, condenser $C_1$ is now only connected during time channel $t_1$ to highway $H_1$, and with equal values for the condensers $C_1$ and $C_2$, the arrangement is therefore practically symmetrical. The two free ends of the two condensers are now interconnected through the paralleled base to collector paths of the transistors, each of the parallel paths including a series resistance $R_1$ and $R_2$ connected to the respective base of the transistors. The respective emitters are connected to fixed D.C. potentials +E and —E through resistors $R_3$ and $R_4$, while finally an additional resistor $R_5$ is in shunt across condenser $C_1$.

With such a circuit, voltage amplification with phase reversal can be achieved, with the complementary PNP and NPN transistors having matched characteristics. The equal resistances of $R_1$ and $R_2$ are relatively large to permit the bases of the respective transistors to assume potentials near the positive and negative supply terminals respectively, the equal resistors $R_3$ and $R_4$ being relatively small stabilizing resistors to limit the voltage drop for the maximum collector current to a small fraction of E. Thus, the common collector voltage is permitted to move positively or negatively over a substantial range in response to the input voltage applied to the common base circuit. Normally, equal currents flow in both halves of the transistor circuit so that the condensers neither receive nor lose any charge.

When a speech sample is received by condenser $C_1$, the base currents will no longer be equal and accordingly there will be a proportional difference between both collector currents, which will charge condenser $C_2$ positively or negatively according to the polarity of the input signal. In this way, the voltage produced across $C_2$ will be proportional to the time integral of the voltage across condenser $C_1$ and therefore also to the amplitude of the sample.

The charge of condenser $C_1$ will leak away through resistor $R_5$ as well as through the path including resistors $R_1$ and $R_2$. This discharge path will be designed so that it will take at most about one sampling interval to completely discharge condenser $C_1$.

It may be noted that the circuit of FIG. 10 is an integrating amplifier which may also be used for instance in reading from magnetic memory systems, to integrate and amplify the read-out signal and convert it into a pulse suitable for transmission over a highway.

While the principles of the invention have been described in connection with specific apparatus, it is to be clearly understood that this description is made only by way of example and not as a limitation on the scope of the invention.

I claim:

1. In a time-division multiplex intercommunication system, first and second electrical energy reactive storage devices, a repeater and means for connecting it between said storage devices for short and equal time intervals, transfer network means in said repeater for transferring energy between said storage devices on a tuned circuit basis during the interval said repeater is connected to said storage devices, the said reactive storage devices having impedances which create energy losses during said transfer, negative resistances in said repeater for producing a gain to compensate said energy losses, means in the said repeater for connecting the said transfer network means, and said negative resistances in circuit with said storage devices for changing the energy stored in the first storage device from a given energy level to a zero energy level and for simultaneously changing the energy stored in the second storage device from a zero energy level to an energy level in excess of said given energy level, the said transfer network means comprising two series branches and one shunt branch with the series branches including a positive inductance in series with one of said negative resistances and one of said storage devices, and with the shunt branch including a resistance and inductance with opposing polarity characteristics.

2. A system as claimed in claim 1 wherein said first and second reactive storage devices comprise first and second condensers, said condensers being interconnected by said transfer network means, with the said transfer of energy therebetween being in the form of sums of two sinusoids with exponentially increasing amplitudes and with the frequency of one sinusoid double the frequency of the other.

3. A system as claimed in claim 1, wherein the ratio between the resistance and inductance of any branch has the same negative factor as any other branch of said transfer network means.

4. A system as claimed in claim 1, wherein the inductances of said series branches and said shunt branch consist of coupled inductances.

5. A system as claimed in claim 1, wherein said branches have a positive shunt resistance, and wherein said branches comprise a delta network of resistances of which two are negative and each have one end connected to ground.

References Cited in the file of this patent

UNITED STATES PATENTS

| | | |
|---|---|---|
| 1,570,215 | Fry | Jan. 19, 1926 |
| 1,920,041 | Vos et al. | July 25, 1933 |
| 2,039,202 | Vos et al. | Apr. 28, 1936 |
| 2,408,072 | Johnson | Sept. 24, 1946 |
| 2,718,621 | Haard et al. | Sept. 20, 1955 |
| 2,927,967 | Edson | Mar. 8, 1960 |
| 2,962,551 | Johannesen | Nov. 29, 1960 |
| 2,962,552 | Crowley | Nov. 29, 1960 |

FOREIGN PATENTS

| | | |
|---|---|---|
| 824,222 | Great Britain | Nov. 25, 1959 |